United States Patent [19]

Robnett et al.

[11] 4,213,726
[45] Jul. 22, 1980

[54] CONTAINER CARRIER VEHICLE

[75] Inventors: James J. Robnett, Happy Valley, Oreg.; Dennis R. Thomas, Mount Hope, Canada

[73] Assignee: Raygo Wagner, Inc., Portland, Oreg.

[21] Appl. No.: 927,623

[22] Filed: Jul. 24, 1978

[51] Int. Cl.² .............................................. B60P 1/04
[52] U.S. Cl. ..................... 414/420; 298/11; 414/458
[58] Field of Search ............... 414/420, 421, 458, 459, 414/471, 478, 491, 498, 546; 254/3 R, 3 B, 3 C; 298/11

[56] References Cited

U.S. PATENT DOCUMENTS

| | | | |
|---|---|---|---|
| 3,520,429 | 7/1970 | Anderson | 414/421 |
| 3,942,664 | 3/1976 | Lemaire | 414/498 |
| 4,026,430 | 5/1977 | Kress | 414/420 |

*Primary Examiner*—Robert G. Sheridan

*Attorney, Agent, or Firm*—Klarquist, Sparkman, Campbell, Leigh, Hall & Whinston

[57] ABSTRACT

A transport vehicle particularly useful for industrial uses and adapted to pick up, carry and subsequently dump a load-carrying receptacle comprising a U-shaped wheel-carried outer frame towed by a tractor which supports an inner U-shaped frame for picking up the receptacle. Vertical rear hoist cylinders elevate the inner U-shaped frame and rotate it about retracted dump cylinders to raise the inner U-shaped frame from an initial horizontal ground-level position to a forwardly tilted travel position. The dump cylinders can then tilt the inner frame about a pivot axis at its rear end to empty cargo from the receptacle. Latching and restraining mechanisms are provided to prevent the receptacle from tipping backward and sliding rearwardly with respect to the inner frame when dumping its load. The latching and restraining mechanisms are gravity-controlled and become inoperative when the inner frame resumes its forwardly tilted travel position.

13 Claims, 10 Drawing Figures

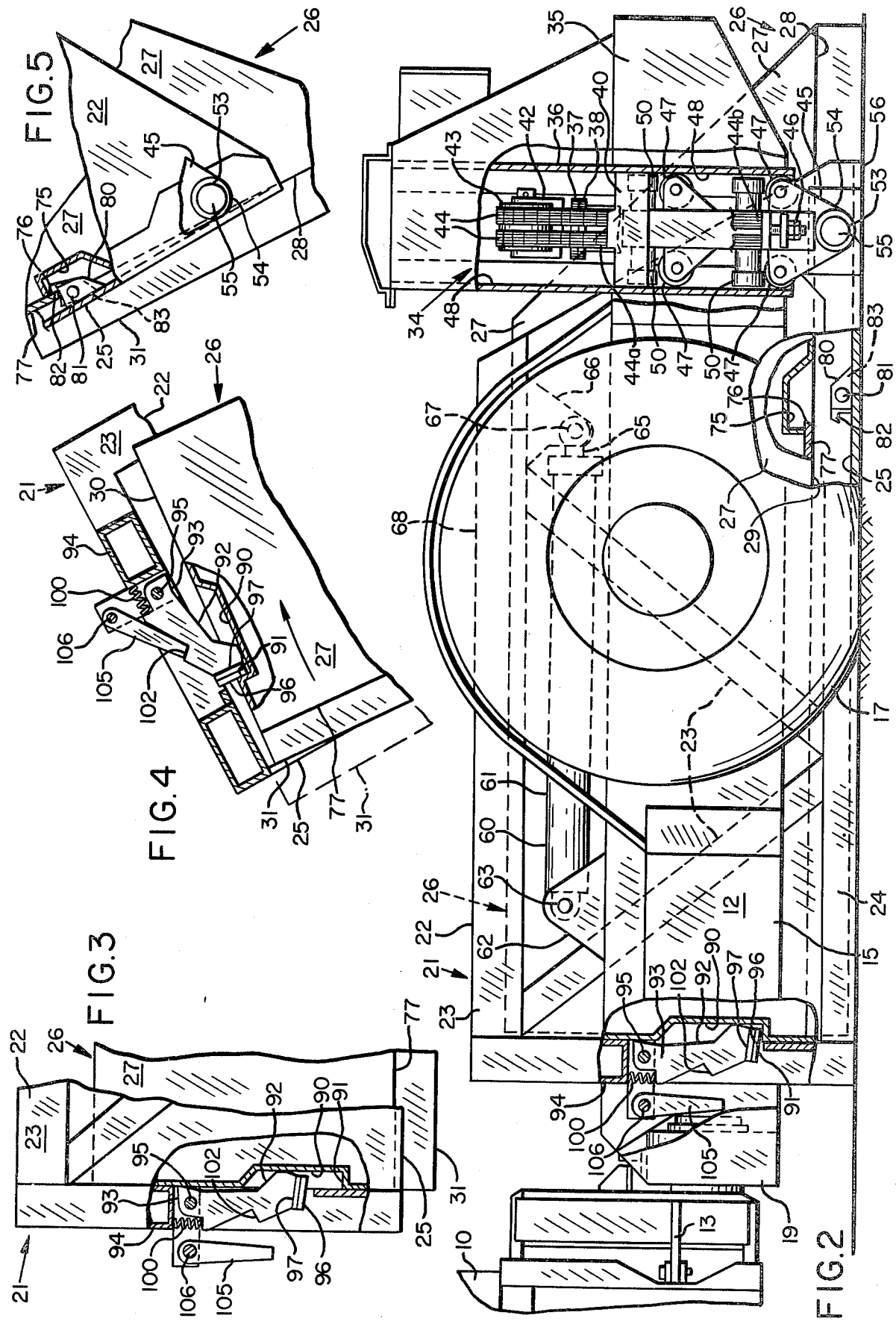

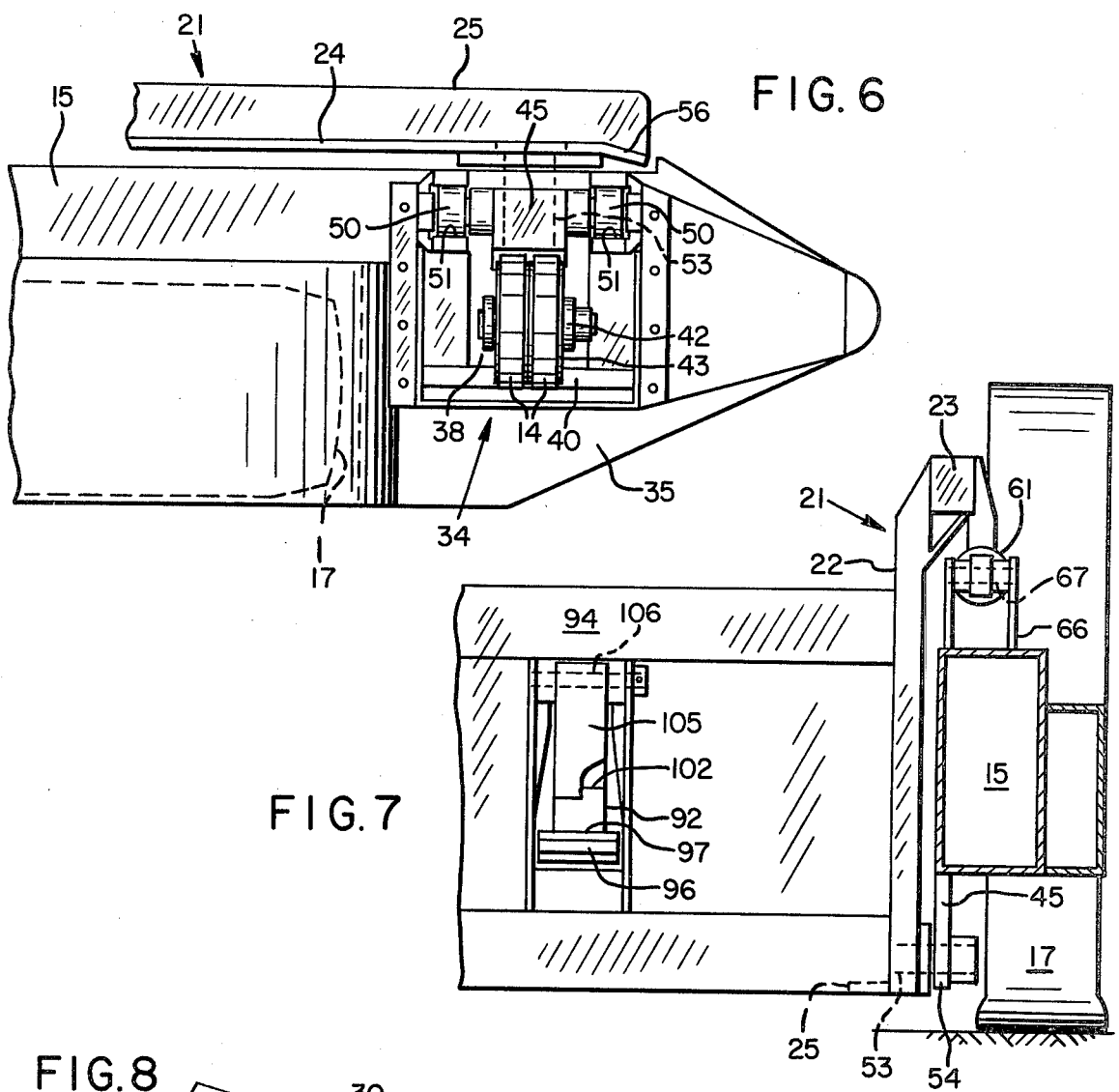
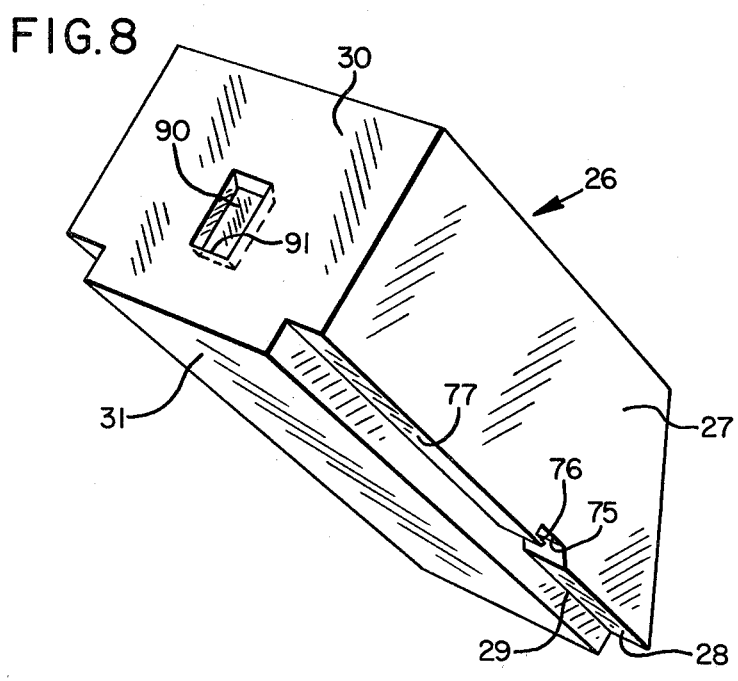

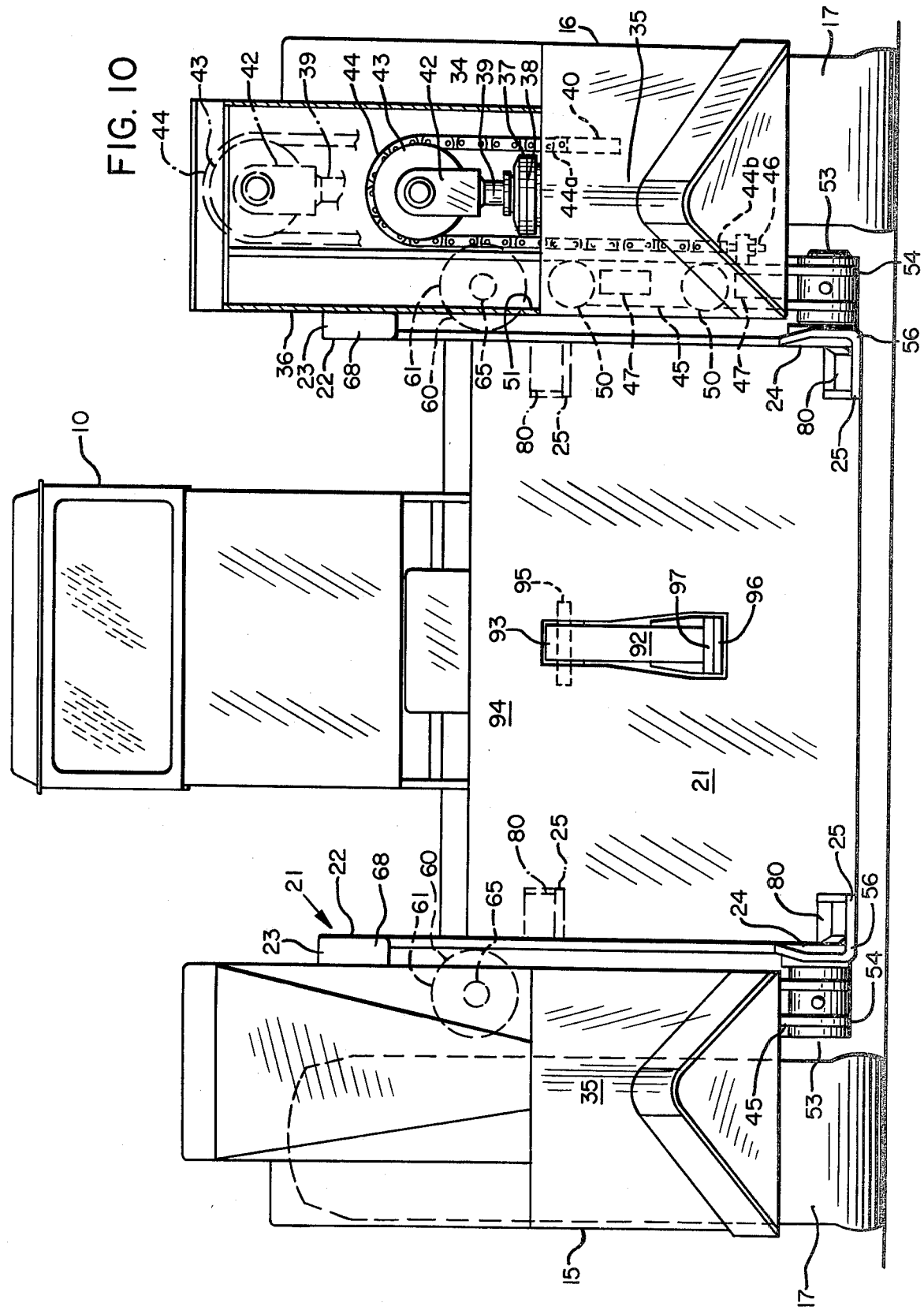

CONTAINER CARRIER VEHICLE

BACKGROUND OF THE INVENTION

This invention relates to container carrying vehicles and, more particularly, to such vehicles comprising an outer rigid U-shaped frame connected for towing to a tractor unit and supporting an inner rigid U-shaped frame with parallel sides provided with members for picking up and transporting a generally open-ended load-carrying receptacle.

Container carrying vehicles of this kind include an outer rigid frame with parallel legs supported by road wheels and interconnected at their forward ends by a transverse frame member to form a U-shaped frame connectable to a tractor unit. The outer frame supports an inner rigid U-shaped frame having parallel sides and an open end. The sides support horizontal flange members at about the ground level such that the vehicle may readily be backed into position to pick up and transport a load-carrying receptacle. Hydraulically operated power means are typically provided for moving the inner U-shaped frame upwardly from a lower end position to an upper end position for transporting the load-carrying receptacle. Further actuation of the hydraulic power system tilts the inner U-shaped frame and the load-carrying receptacle thereon, thereby to dump the contents from the receptacle.

A vehicle of the foregoing type is disclosed in Andersson U.S. Pat. No. 3,520,429. The vehicle therein disclosed has vertical guides at each of the rear end portions of the legs of the outer U-shaped frame for guiding carriages provided with pivot pin supports for pivotally supporting the adjacent ends of the legs of the inner U-shaped frame. The vehicle is further provided with hydraulically operable power means for moving the forward and rearward ends of the inner U-shaped frame between a lower end position and an upper end position and subsequently, the forward end of the inner U-shaped frame further above its upper end position to tilt the inner U-shaped frame about the pivot axis of the leg-supporting pivot pins. In this manner the inner frame is adapted to empty the load-carrying receptacle.

Vehicles of the type disclosed in the aforementioned patent, however, require separate front and rear hydraulic hoists. They further require separate controls for the forward and rearward hoists to control the lifting of the forward and rearward ends of the inner U-shaped member to raise and/or lower the same and to achieve a satisfactory position for transporting the load-carrying receptacle.

It is thus an object of the present invention to provide a container-carrying vehicle of the above-mentioned type that will obviate the necessity of providing independent front hoists.

It is a further object of the present invention to provide such a vehicle wherein the rear hoists interact with dumping cylinders automatically to achieve a desirable transport position for the receptacle when the inner U-shaped frame is raised from its horizontal pick-up position to its receptacle-transporting position.

It is a further object of the present invention to provide a vehicle of the above type with means that will achieve a forwardly tilted travel position automatically when the inner U-shaped frame is raised from its horizontal ground-level position to its travel position, thereby to prevent premature discharge of cargo from the receptacle.

It is a still further object of the present invention to provide a vehicle of the above type wherein the rear hoists provide a large vertical displacement of the rear end of the inner U-shaped frame for a lesser displacement of the hoists themselves.

It is a still further object of the present invention to provide latching and restraining mechanisms which require no operator controls, but which utilize the weight of the receptacle to restrain the same during dumping and which mechanisms automatically release under the influence of gravity upon resumption by the receptacle of its forwardly tilted travel position.

These and other objects and advantages of the invention are achieved with the vehicle of the present invention. The vehicle is provided with rear hoists mounted on each leg of an outer U-shaped frame. The rear hoists are connected to carriage means adapted to travel in vertical guides and which carriage means include pivot pin means for supporting the adjacent ends of the sides of an inner U-shaped frame at first pivot support points positioned adjacent the bottoms of such ends. The rear hoists are adapted to raise the first pivot support points from a lower end or ground level position of the inner frame to an upper end position thereof. The rear hoists are connected to the carriage means by chains entrained over pulleys mounted at the upper ends of the hoists, whereby extension of the hoists a given distance raises the adjacent ends of the inner U-shaped frame an amount equal to twice such distance.

The vehicle further includes hydraulic dumping means pivotally attached at one end to each of the sides of the inner U-shaped frame at second pivot support points disposed forwardly of and vertically above the first pivot support points. The hydraulic dumping means comprise hydraulic power devices which are pivotally attached at their other ends to third support points on the adjacent ends of the legs of the outer U-shaped frame. The third support points are positioned at the same horizontal level as the second pivot support points on the sides of the inner U-shaped frame when the latter is in its lower end or ground level position.

The hydraulic dumping means pivot about the third support points on the legs of the outer U-shaped frame and the second pivot support points on the sides of the inner U-shaped frame rotate upwardly about the third support points as the rear hoists raise the first pivot support points from their lower end position on the inner U-shaped frame to their upper end position. In this manner the inner U-shaped frame is simultaneously elevated and rotated by the action of the rear hoists, whereby the inner frame is automatically tilted forwardly downwardly in its upper end or travel position. Further extension of the hydraulic dumping means tilts the inner U-shaped frame about its first pivot support points to empty cargo from the receptacle carried thereby.

The invention further includes latching and restraining mechanisms which restrain the receptacle during dumping and automatically release the same under the influence of gravity upon the resumption of the forwardly tilted travel position. Such means include pockets in a lower surface of the load-carrying receptacle adjacent pick-up members on the sides of the inner U-shaped frame, each of such pockets being provided with a projection extending inwardly from its forwardly disposed end. A latch mounted on each pick-up member is positioned beneath each pocket when the inner U-shaped frame is positioned fully beneath the receptacle. Each latch has a detent adapted to engage the projection to prevent the receptacle from sliding rearwardly with respect to the inner U-shaped frame when the latter is tilted to its dumping position.

The invention further includes a pocket in the forward end of the receptacle having a lower surface generally parallel to the base thereof. A pawl member pivotally attached at its upper end to the forward end of the inner U-shaped frame is spring-biased away from such forward end to project into the pocket when the inner U-shaped frame is positioned fully therebeneath. The pawl member is provided with a notch in its forward face. A pendulum member is pivotally mounted on the forward end of the inner U-shaped frame forwardly of the pawl member. The pendulum member is adapted to hang free of the pawl member when the inner U-shaped frame is in both its lower ground level and upper travel positions. The pendulum member, however, rotates into the notch in the forward face of the pawl member when the inner U-shaped frame is further tilted about the first pivot support points, thereby to lock the pawl member into engagement with the lower surface of the pocket.

When the inner U-shaped frame is returned to its travel position by retracting the hydraulic dumping means, the pendulum member swings away from the pawl member, permitting the latter to be released from the pocket. The receptacle slides forwardly on the inner U-shaped frame to release itself from the latches engaging the lower pockets. Thus, when the inner U-shaped frame is lowered by the rear hoists to its horizontal ground level position, the receptacle can be readily disengaged therefrom by driving the vehicle forwardly with the inner U-shaped frame in such horizontal ground level position.

BRIEF DESCRIPTION OF THE DRAWINGS

FIG. 2 is a view to an enlarged scale similar to FIG. 1, but with parts broken away to illustrate the rear hoist mechanisms and the latching and restraining mechanisms, the inner U-shaped frame being illustrated in its lower end or ground level position.

FIG. 3 is a detail view with parts broken away to illustrate the forward latching and restraining mechanism in the position it occupies when the inner U-shaped frame is raised to its forwardly tilting travel position.

FIG. 4 is a detail view with parts broken away to illustrate the position of the forward latching and restraining mechanism when the inner U-shaped frame is tilted by the hydraulic dump means to its cargo-discharging position.

FIG. 5 is a detail view with parts broken away illustrating the lower latching and restraining mechanism in the position it occupies when the inner U-shaped frame is tilted to its cargo-discharging position.

FIG. 6 is a plan view of the ends of the legs of the outer and inner U-shaped frames.

FIG. 7 is a view of the forward end of the inner U-shaped frame.

FIG. 8 is a perspective view of a receptacle adapted for use with the vehicle of the present invention.

FIG. 10 is an end view of the vehicle with parts broken away to show details of the rear hoists.

DESCRIPTION OF THE PREFERRED EMBODIMENT

Figure 1:
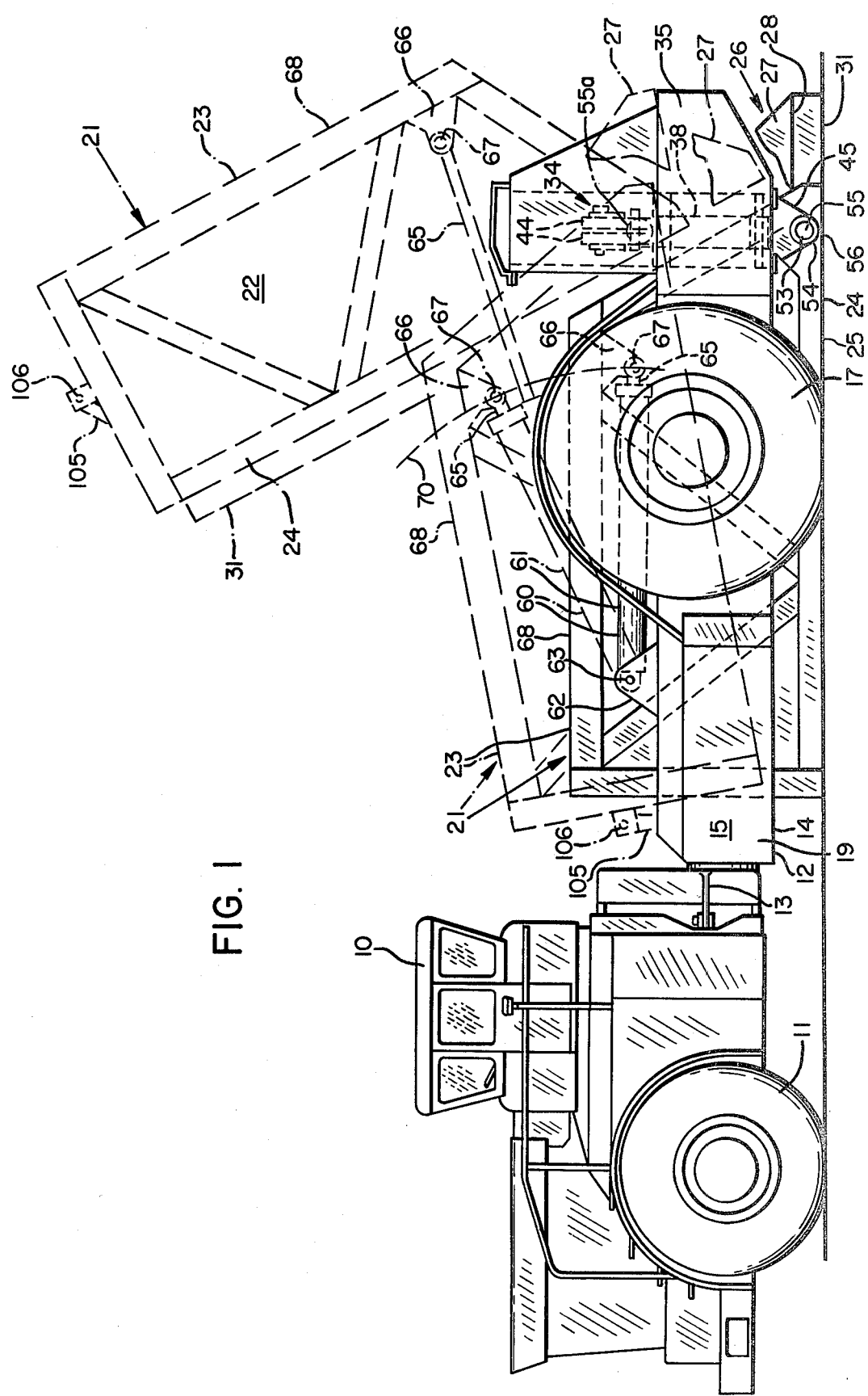
FIG. 1 is a side elevational view of a container-carrying vehicle according to the present invention, the inner U-shaped frame being illustrated by full lines in its lower end or ground level position and by dashed lines in its travel and dumping positions.
Figure 9:
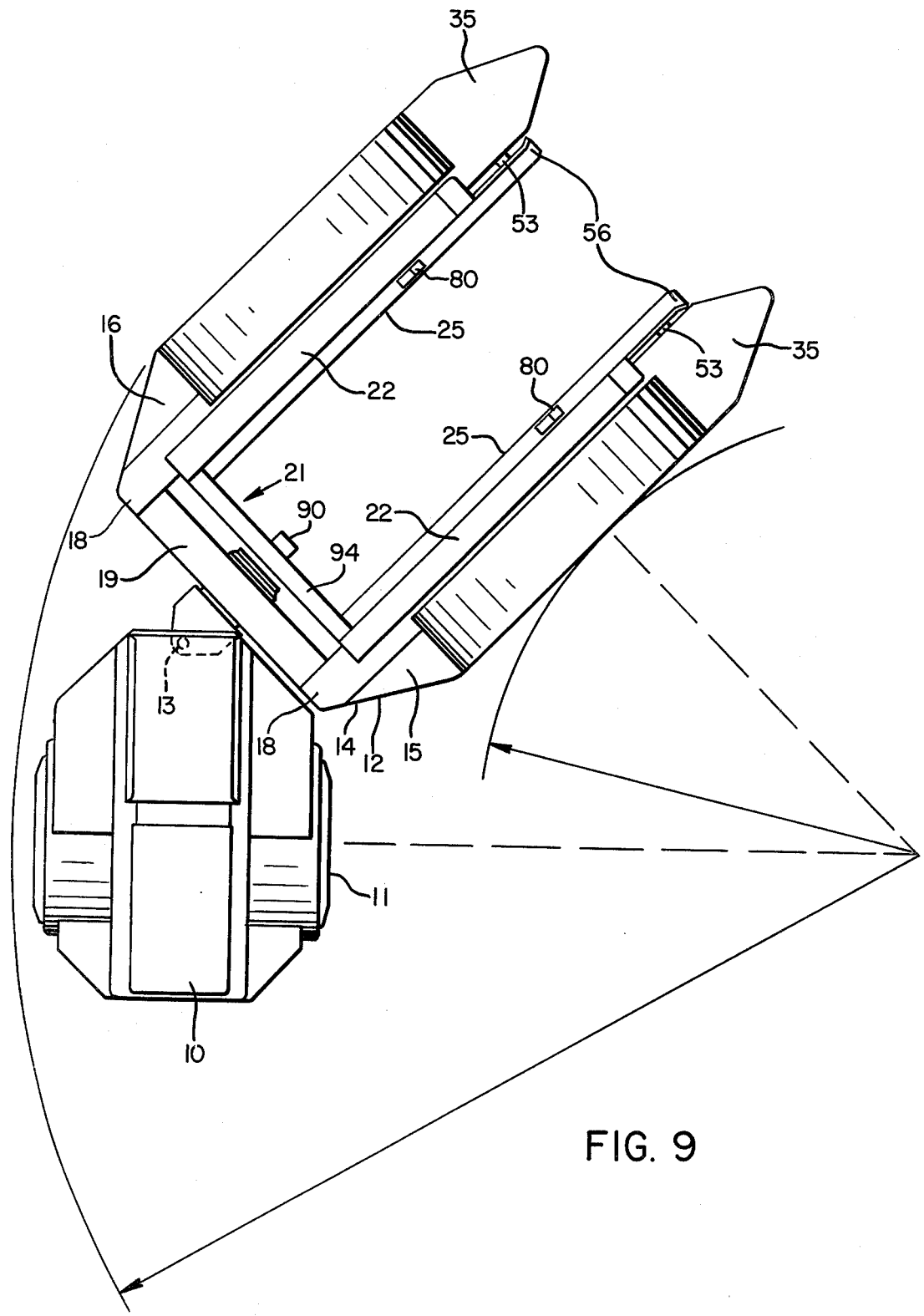
FIG. 9 is a plan view of the vehicle illustrating its turning radii.

The container-carrying vehicle of the present invention includes a conventional tractor unit 10 supported by a single pair of forward driving and steering wheels 11 and connected to a rear frame portion 12 by a conventional pivot joint 13. Frame 12 comprises a generally U-shaped outer frame 14 having parallel legs 15, 16 comprising generally box-beam structures supported by road wheels 17 and interconnected at their forward ends 18 by a transverse frame member 19.

The outer U-shaped frame 14 supports an inner U-shaped frame 21 having parallel sides 22 comprising truss members 23, the lower longitudinal members 24 of which include horizontal inwardly extending flanges 25 for picking up and supporting a load-carrying basket or receptacle 26 having sides 27 recessed at their bottoms 28 to form shoulders 29 to receive the flanges 25. The receptacle 26 typically is used at iron or steel works for transporting, for example, iron ore, scrap iron, iron slag or molten slag. Typically, the receptacle 26 comprises the aforementioned sides 27, a forward end wall 30 and a bottom 31, but is open-ended to facilitate dumping its cargo.

The inner U-shaped frame 21 is supported by the outer U-shaped frame 14 and can be raised and lowered relative thereto such that when in its lowermost position, the inner frame 21 can be inserted under the shoulders 29 of the receptacle 26 and then elevated to lift the receptacle 26 for subsequent transport. The inner U-shaped frame 21 is tiltable to a dump position so that material contained in the receptacle 26 can be dumped therefrom at a desired location.

A rear hoist 34 is mounted at the end 35 of each of the legs 15, 16 of the outer U-shaped frame 14. Each such hoist 34 includes a guideway 36 in which is mounted a hydraulic jack 37 having a cylinder 38 secured to the frame structure of the respective leg 15, 16 and a piston 39 terminating in a yoke 42 supporting pulleys 43 over which are trained chains 44 anchored at their outboard ends 44a to chain anchors 40 in the legs 15, 16 and at their inboard ends 44b to a carriage 45 by bolts 46. The carriage 45 is provided with four forward-aft rollers 47 which ride in tracks 48 interiorly of the guideway 36 and four sideways rollers 50 which ride in tracks 51, which are perpendicular to tracks 48, thereby to ensure that the carriage 45 is provided with the required stable, guided vertical motion. Each carriage 45 supports a pivot pin 53 at its lower end 54, the pivot pin 53 being engageable in a first pivot support point 55 at the rear ends 56 of the adjacent lower longitudinal members 24 of the inner U-shaped frame 21. The hoists 34 are thus adapted to raise the points 55 from their lowermost position, when the flanges 25 are substantially at ground level, to their uppermost position 55a, which position is illustrated in dashed lines in FIG. 1. The use of the chains 44 entrained over the pulleys 43 results in the carriages 45 (and thus the end of the inner frame 21) being raised twice the amount of the extension of the pistons 39, thereby to provide twice as much vertical displacement for the frame 21 for a given amount of piston travel.

A second set of hydraulic jacks 60 are disposed in the legs 15, 16 of the outer U-shaped frame 14. Each jack 60 includes a cylinder 61 pivotally attached to a bracket 62 on a leg 15, 16, of the frame 14 at a fixed point of support 63. A piston 65 is pivotally attached to a bracket 66 at a second pivot support point 67 on the upper longitudinal member 68 of each truss 23. The points 67 are positioned forward of and vertically above the first pivot support points 55 and at the same horizontal level as the fixed points of support 63 when the frame 21 is in its lower end or ground level position. See FIG. 2.

As shown in FIG. 1, when the rear hoists 34 raise the carriages 45, since the distance between the first and second pivot support points 55 and 67 on frame 21 is constant, the jacks 60 are forced to rotate counter-clockwise because the second pivot support points 67 are vertically above the first pivot support points 55. Inasmuch as the motion of the carriages 45 is vertical and that of the support points 67 is along the arcs 70, the total vertical rise of the first pivot support points 55 is greater than the vertical rise of the second pivot support points 67. This results in the inner frame 21 being raised and simultaneously rotated, the second pivot support points 67 rotating counter-clockwise about the fixed points of support 63 (as shown in FIG. 1) and the rear end of the inner frame 21 achieving a higher elevation than the forward end, thereby to achieve a forwardly tilted travel position as shown in the dashed lines in FIG. 1.

Extension of the pistons 65 from the cylinders 61 can then rotate the forward end of the inner frame 21 clockwise about the first pivot support points 55 (in their upper end position 55a) to achieve the dumping position illustrated. It can thus be seen that the inter-relationship of the geometrical configuration of the rear hoists 34 and hydraulic dumping jacks 60 automatically achieves a forwardly tilting position of the inner frame 21 as the hoists 34 lift the receptacle 26 from its horizontal ground-resting position, thereby to prevent material in the receptacle 26 from being discharged out its open rear end during transport.

The invention further includes latching and restraining mechanisms which combine with the forwardly tilting means to restrain the receptacle 26 during dumping and automatically release it under the influence of gravity upon resumption of the forwardly tilted travel position. The latching and restraining mechanisms engage the receptacle 26 at each shoulder 29 and also at its front end wall 30.

As shown in FIGS. 2 and 8, a pocket 75 is formed in each receptacle shoulder 29 near the rear end of the receptacle 26 and includes a projection 76 formed by permitting the plate 77 to extend into the pocket 75 as shown. A latch 80 is pivotally mounted on a support 81 mounted on each horizontal flange 25, the latch 80 being so positioned that it is directly beneath the pocket 75 when the inner U-shaped frame 21 is positioned fully beneath the receptacle 26. Each latch 80 has a forwardly extending detent 82 which is adapted to engage the projection 76 when the receptacle 26 slides rearwardly along the flanges 25. The latches 80 are further provided with a sloping bottom as at 83 to permit the receptacle 26 to attain a slight angular attitude with respect to the inner frame 21, i.e., to permit the forward end of the receptacle 26 to be lifted slightly away from the horizontal flanges 25 during dumping.

The latching and restraining mechanisms further include the provision of a pocket 90 in the forward end wall 30 of the receptacle 26, the pocket 90 having a lower surface 91 preferably made parallel to the receptacle bottom 31. A pawl member 92 is pivotally attached at its upper end 93 to a horizontal box beam 94 in the forward end of the inner frame 21. The pawl member 92 rotates about a pivot point 95 and has a resilient pad 96 attached to its lower end 97. A spring 100 normally biases the pawl 92 rearwardly, i.e., away from the forward end of frame 21 to urge the pawl member 92 into the pocket 90 when the inner frame 21 is positioned fully beneath the receptacle 26 (FIG. 2). The pawl member 92 is further provided with a notch 102 in its forward face to receive a pendulum member 105 pivotally supported on a pin 106 also supported by the box beam 94. The suspension causes the pendulum member 105 to hang free of the pawl member 92 when the inner frame 21 is in either its lower or ground level position (FIG. 2) or in its upper or travel position (FIG. 3). However, when the inner frame 21 is rotated clockwise (rearwardly) about the first pivot support points 55 as when dumping the receptacle 26, the pendulum member 105 rotates about point 106 thereby to slip into the notch 102 in the pawl member 92 to retain the lower end 97 thereof in contact with the lower surface 91 of pocket 90. See FIG. 4. The motion permits a slight angular attitude of the receptacle 26 with respect to the horizontal flanges 25 consistent with the slope of the bottom 83 of the latch 80.

OPERATION

The container-carrying vehicle of the present invention is driven to the site of a loaded receptacle 26 and the inner U-shaped frame 21 is lowered to about ground level by the rear hoists 34. The vehicle is then backed toward the container 26 to slide the horizontal flanges 25 beneath the receptacle's shoulders 29, as shown in the full line position of FIG. 2. The rear hoists 34 then elevate the frame 21 to the travel position, the geometry of the rear hoists 34 and hydraulic jacks 60 as respects their respective support points 55 and 67 causing the inner frame 21 and receptacle 26 to tilt forwardly as it is raised to prevent material in the receptacle 26 from being discharged out its open rear end.

To dump the material contained in the receptacle 26, the pistons 65 are then extended from the dumping cylinders 61 to rotate the forward end of the frame 21 further about the first pivot support points 55. The container 26 is prevented from sliding rearwardly with respect to the horizontal flanges 25 by the latches 80 which engage the projections 76 in the pocket 75 formed in the shoulders 29 of the receptacle 26. At the same time, the pendulum member 105 rotates about point 106 to engage the notch 102 in the pawl member 92 to restrain the forward portion of receptacle 26 and prevent it from tipping backward from the frame 21 when dumping its load. See FIG. 4. The pawl member 92 is retained in the forward pocket 90 of the receptacle 26, the resilient pad 96 on its lower end 97 engaging the surface 91 during the dumping operation. The slight amount of angular movement which results from the geometry of the forward restraining mechanism causes the latches 80 to rotate about their supports 81, the sloping bottoms 83 engaging the flange members 25 as shown in FIG. 5.

When the inner U-shaped frame 21 is returned to its forwardly tilting travel position by retracting the pistons 65, the pendulum member 105 swings away from the pawl member 92 (see FIG. 3), permitting the pawl member 92 to be released from engagement with the lower surface 91 of pocket 90. The empty receptacle 26 then slides forwardly on the flanges 25 to release itself from the latches 80. Thus, when the inner frame 21 is lowered by the rear hoists 34 to ground level, latches 80 clear pockets 75, disengaging the receptacle 26 from the frame 21, so that the frame 21 can be pulled from beneath the container 26 by driving the vehicle forwardly with the frame 21 in its lower or ground level position.

While the apparatus disclosed herein constitutes a preferred form of the invention, it should be understood that the apparatus is capable of mechanical alteration without departing from the spirit of the invention and that any such mechanical alterations and commercial adaptations as fall within the scope of the appended claims are intended to be included therein.

We claim:

1. Apparatus for simultaneously raising and tipping a structure from a first lower position at which the bottom of said structure is substantially horizontal to a second upper position at which one end thereof is more highly elevated than the other end thereof, said structure having a first pivot support point positioned adjacent the bottom of said one end thereof and a second pivot support point disposed forwardly of and vertically above said first pivot support point, comprising:
   carriage means engageable with said structure at said first pivot support point and constrained to raise said first pivot support point substantially vertically; and
   a support arm pivotally attached at one end to said structure at said second pivot support point, said support arm being pivotally attached at its other end to a fixed point of support, said support arm pivoting and said second pivot support point on said structure rotating upwardly along an arcuate locus about said fixed point of support as said carriage means raises said first pivot support point on said structure, said second pivot support point being raised a distance less than said first pivot support point,
   said structure thereby being simultaneously vertically raised and rotated, whereby said one end thereof is more highly elevated than said other end thereof at said second upper position.

2. Apparatus as in claim 1 further comprising substantially vertical guide means, said carriage means being adapted to travel in said vertical guide means.

3. Apparatus as in claim 2 in which said support arm comprises a hydraulic cylinder and piston power device, said device being adapted further to rotate said structure about said first pivot support point when said structure is in said second upper position.

4. Apparatus as in claim 3 further comprising a second hydraulic cylinder and piston power device operably connected to said carriage means for raising said carriage means in said vertical guide means.

5. In a transport vehicle for heavy loads having an outer rigid frame with parallel legs supported by road wheels, said legs being interconnected at their forward ends by a transverse frame member to form a U-shaped frame connected to a tractor unit and supporting an inner rigid U-shaped frame with parallel sides provided with horizontal flange members for picking up and supporting a load-carrying receptacle, said load-carrying receptacle being adapted to be carried by said inner U-shaped frame, said receptacle having sides recessed at their bottoms to form shoulders, said shoulders being adapted to be engaged by said horizontal flange members on said sides of said U-shaped frame, said horizontal flange members being positioned sufficiently below said shoulders on said receptacle when said inner U-shaped frame is in a lower end position to enable said vehicle to position said inner U-shaped frame beneath said receptacle, said outer U-shaped frame having a substantially vertical guide at the rear end portion of each of its legs for guiding supporting members which pivotally support said sides of said inner U-shaped frame, said vehicle being further provided with hydraulically operable power means for moving the forward and rearward ends of said inner U-shaped frame between said lower end position and an upper end position and subsequently, said forward end of said inner U-shaped frame further above its upper end position to rotate said inner U-shaped frame about the pivot axis of said side supporting members, the improvement comprising:
   first hydraulic hoist means supported at said rear end portion of each of said legs of said outer U-shaped frame;
   carriage means connected to each of said first hydraulic hoist means and adapted to travel in said vertical guides in said rear end portions of said legs of said outer U-shaped frame, each of said carriage means being provided with pivot pin means for supporting the adjacent ends of said sides of said inner U-shaped frame at first pivot support points positioned adjacent the bottoms of said sides, said first hydraulic first means being adapted to raise said carriage means in said vertical guides to raise said first pivot support points on said sides of said inner U-shaped frame from said lower end position to said upper end position;
   second hydraulic hoist means pivotally attached at one end to each of said sides of said inner U-shaped frame at second pivot support points disposed forwardly of and vertically above said first pivot support points, each of said second hydraulic hoist means being pivotally attached at its other end to a third support point on the adjacent end of the respective leg of said outer U-shaped frame, said third support points being disposed generally at the same horizontal level as said second pivot support points on said sides of said inner U-shaped frame when said inner U-shaped frame is in said lower end position, said second hydraulic hoist means pivoting about said third support points on said legs of said outer U-shaped frame and said second pivot support points on said sides of said inner U-shaped frame rotating upwardly along an arcuate locus about said third support points as said first hydraulic hoist means raise said first pivot support points from said lower end position to said upper end position, said second pivot support points being raised a distance less than said first pivot support points, said inner U-shaped frame thereby being simultaneously elevated and rotated, whereby said inner U-shaped frame tilts forwardly downwardly in said upper end position.

6. A transport vehicle as in claim 5 further comprising:
   a pocket in each shoulder of said receptacle, each said pocket having a projection extending inwardly from its forwardly disposed end; and a latch mounted on the respective horizontal flange member of said inner U-shaped frame, each said latch being positioned beneath said respective pocket when said inner U-shaped frame is positioned fully beneath said receptacle, said latch having a detent adapted to engage said projection to prevent said receptacle from sliding rearwardly with respect to said inner U-shaped frame.

7. A transport vehicle as in claim 6 in which said latch is pivotal with respect to said horizontal flange member to enable the forward end of said receptacle to lift away from said inner U-shaped frame.

8. A transport vehicle as in claim 5 further comprising:

a pocket in the forward end of said receptacle, said pocket having a lower surface generally parallel to the base of said receptacle;

a pawl member pivotally attached at its upper end to the forward end of said inner U-shaped frame, said pawl member being spring biased away from said forward end of said inner U-shaped frame to project into said pocket in said forward end of said receptacle when said inner U-shaped frame is positioned fully beneath said receptacle, said pawl member being provided with a notch in its forward face; and a pendulum member pivotally mounted on said forward end of said inner U-shaped frame forwardly of said pawl member, said pendulum member being adapted to hang free of said pawl member when said inner U-shaped frame is in both said lower end and upper end positions, said pendulum member being adapted to rotate into said notch in said forward face of said pawl member when said inner U-shaped frame is further rotated about said first pivot support points to retain said pawl member in engagement with said lower surface of said pocket in said receptacle.

9. A transport vehicle as in claim 8 further comprising:

a resilient pad on the lower end of said pawl member for contact with said lower surface of said pocket.

10. In combination with a tipping frame for picking up, carrying and subsequently dumping a load-carrying receptacle adapted to fit within and be supported by said tipping frame, said frame having a generally vertical forward wall, bottom means to support said receptacle and an open rear end, said receptacle having bottom means and a generally vertical forward wall, the improvement comprising:

a pocket in said forward wall of said receptacle, said pocket having a lower surface generally parallel to said bottom of said receptacle;

a pawl member pivotally attached at its upper end to said forward wall of said frame, said pawl member being spring-biased away from said forward wall of said frame to project into said pocket in said forward wall of said receptacle when said frame is positioned fully beneath said receptacle, said pawl member being adapted to engage said lower surface of said pocket and prevent said receptacle from lifting away from said frame;

at least one second pocket in said bottom means of said receptacle;

a projection mounted on said bottom means of said frame and adapted to engage said second pocket when said frame is positioned fully beneath said receptacle and supporting the same, said projection preventing said receptacle from sliding on said bottom means of said frame when said frame is supporting said receptacle;

whereby said receptacle is restrained within said frame when said forward wall of said frame is elevated over said rear end thereof to dump contents from said receptacle, said frame being able to be withdrawn from beneath said receptacle when lowered sufficiently to disengage said projection from said second pocket therein.

11. The combination of claim 10 in which said receptacle comprises at least one side recessed at its bottom to form a shoulder, said second pocket being disposed within said shoulder.

12. The combination of claim 11 further comprising a projection extending inwardly from the forwardly disposed end of said second pocket and a forwardly extending detent mounted on said projection on said bottom means of said frame, said detent being adapted to engage said projection to prevent said receptacle from sliding rearwardly with respect to said bottom means of said frame.

13. The combination of claim 10 further comprising a notch in the forward face of said pawl member; and a pendulum member pivotally mounted on said forward wall of said frame forwardly of said pawl member, said pendulum member being adapted to hang free of said pawl member when said frame is generally horizontally disposed beneath said receptacle, said pendulum member being adapted to rotate into said notch when said forward wall of said frame is elevated over said rear end thereof to retain said pawl member in engagement with said lower surface of said pocket to prevent said receptacle from lifting away from said frame.

* * * * *